United States Patent [19]
Behrends et al.

[11] Patent Number: 6,088,638
[45] Date of Patent: Jul. 11, 2000

[54] SAFETY SYSTEM FOR AN ELECTRICAL SYSTEM

[75] Inventors: Holger Behrends, Hannover; Thomas Dieckmann, Pattensen; Rainer Giese, Scheyern; Michael Gräf, Munich; Ricky Hudi, Kösching, all of Germany

[73] Assignees: Continental AG, Hannover; BMW AG, Munich, both of Germany

[21] Appl. No.: 09/131,315

[22] Filed: Aug. 7, 1998

[30] Foreign Application Priority Data

Aug. 9, 1997 [DE] Germany ................... 197 34 598

[51] Int. Cl.[7] ........................................ G06F 17/00
[52] U.S. Cl. .................. 701/43; 701/76; 303/191; 303/15
[58] Field of Search ..................... 701/41, 43, 70, 701/71, 76; 303/191, 125, 15, 20; 307/10.1, 116, 122.04, 125; 188/72.1, 72.8, 158, 162, 265

[56] References Cited

U.S. PATENT DOCUMENTS 5,646,509 7/1997 Berlund et al. ................... 320/48
5,810,454 9/1998 Prinzler et al. ................... 303/20
5,957,551 9/1999 Maron et al. ................... 303/191
5,962,931 10/1999 Maron et al. ................... 303/125

FOREIGN PATENT DOCUMENTS 3502100 7/1986 Germany .

Primary Examiner—Jacques H. Louis-Jacques
Attorney, Agent, or Firm—Walter Ottesen

[57] ABSTRACT

The invention relates to a safety system having electrical consumers (18a, 18b) which are supplied with electrical energy in normal operation from an electrical energy source (2, 4, 6). The safety system includes an electrical energy store (14a, 14b) which supplies the electrical consumers (18a, 18b) with electrical energy when the instantaneous operating voltage at the energy source (2, 4, 6) drops below a limit value. The rated voltage of the energy store (14a, 14b) is less than the rated voltage of the electrical energy source (2, 4, 6) and the electrical energy store (14a, 14b) is connected to the electrical energy source (2, 4, 6) via a switchover element (16a, 16b) which assumes the function of a diode. The switchover element (16a, 16b) ensures that a switchover from normal operation to an emergency operation takes place automatically and that, during normal operation, the electrical energy store (14a, 14b) is not charged unintentionally by the electrical energy source (6).

4 Claims, 1 Drawing Sheet

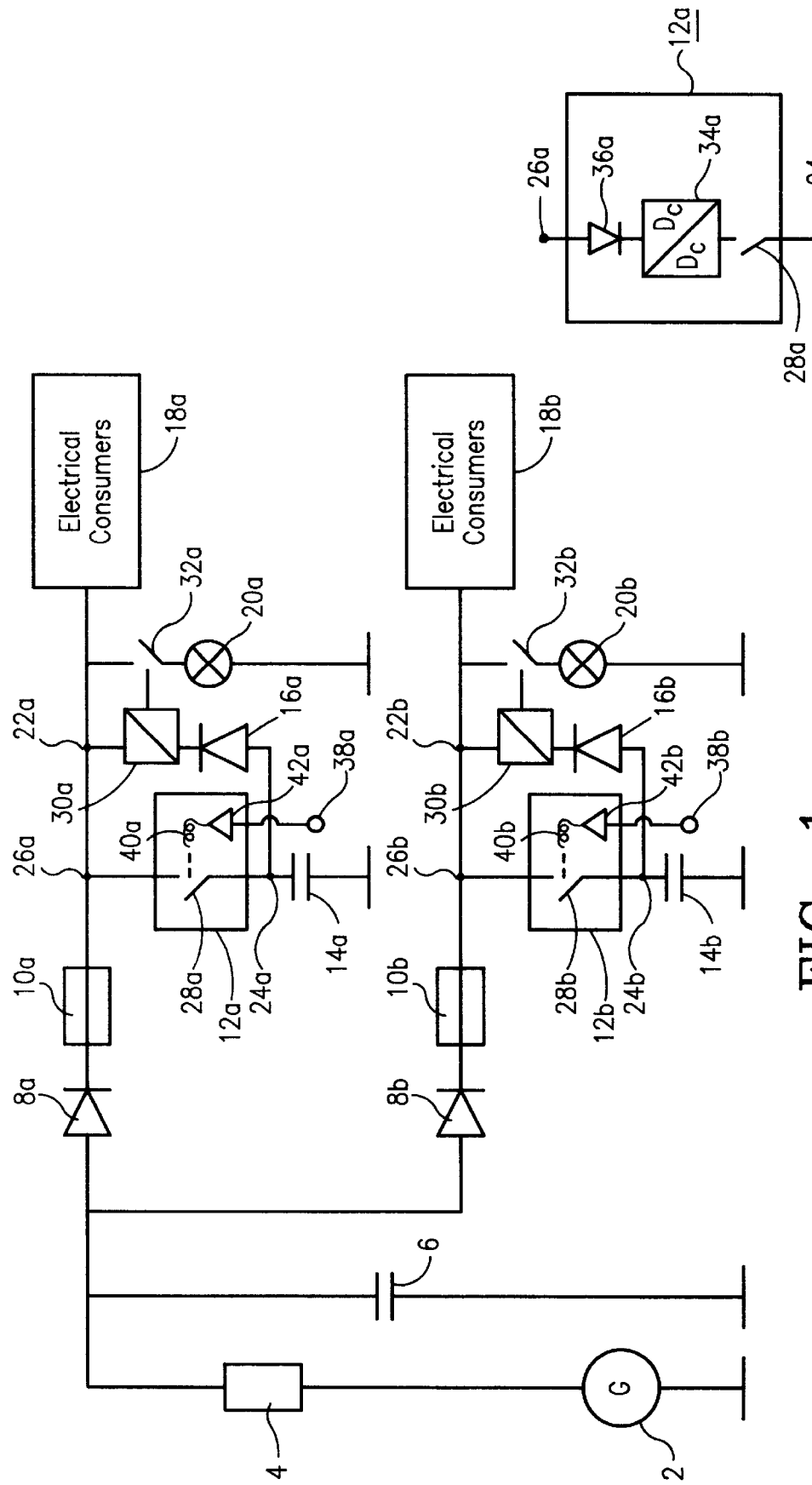

SAFETY SYSTEM FOR AN ELECTRICAL SYSTEM

FIELD OF THE INVENTION

The invention relates to a safety system for an electrical system such as an electrical brake system or an electrical steering system for a motor vehicle.

The safety system includes consumers which are driven with electrical energy; an electrical energy source having a first rated voltage which supplies the consumers with electrical energy during normal operation; and an electrical energy store having a second rated voltage. The electrical energy store supplies the consumers with electrical energy when the instantaneous operating voltage at the energy store drops below a limit value. The system further includes a switchover element which connects the energy store to the consumers when the instantaneous operating voltage at the electrical energy store drops below the limit value.

The first energy store here can be, for example, a generator or a battery or a battery which is connected to a generator, for example, in an on-board network of a motor vehicle.

BACKGROUND OF THE INVENTION

One such safety system is disclosed, for example, in German patent publication 3,502,100 where it is utilized in a hydraulic brake system for a motor vehicle. In normal operation, the hydraulic brake system is supplied from the electrical energy source in the form of a battery. The instantaneous operating voltage is monitored by a voltage-monitoring unit. An instantaneous operating voltage, which drops below a limit value because of a malfunction of the battery, is detected by the voltage-monitoring unit whereupon the monitoring unit addresses a switchover element assigned thereto. The switchover element connects the electrical consumers of the hydraulic brake system to the electrical energy store. The battery is charged by a generator and, as soon as a rated voltage is applied to the battery, the switchover element is again addressed by the voltage-monitoring unit and the switchover element again switches back to the normal operation of the hydraulic brake system. If the instantaneous operating voltage drops below a limit value at the electrical energy store as a consequence of the discharge, this is likewise detected by the voltage-monitoring unit which then addresses a charge switch unit which then connects the second electrical energy store to the generator so that this second store too can be charged.

The foregoing shows that the hydraulic brake system disclosed in German patent 3,502,100 can be characterized as safe because the electrical consumers of the hydraulic brake system are supplied by a second electrical energy store when there is a malfunction of the battery. The instantaneous operating voltage of the battery must, however, be continuously detected by the voltage-monitoring unit and, in the case of a fault, this monitoring unit must drive the switchover element. A switchover from the battery to the second energy store is no longer possible if the voltage-monitoring unit malfunctions or if there is an incorrect measurement of the instantaneous operating voltage or if there is a malfunction of the control line from the voltage-monitoring unit to the switchover element. In these cases, the reliability of the hydraulic brake system is affected. Furthermore, the safety system disclosed in German patent publication 3,502,100 has a complicated configuration.

SUMMARY OF THE INVENTION

It is an object of the invention to provide a system having a simple configuration and a high degree of safety.

The safety system of the invention is for an electrical consumer including an electrical brake arrangement or an electrical steering arrangement for a motor vehicle. The safety system includes: an electrical energy source having a first rated voltage and supplying the electrical consumer with electrical energy during normal operation; an electrical energy store having a second rated voltage less than the first rated voltage; a switchover element for connecting the consumer to the energy store when the instantaneous operating voltage of the energy source drops below a limit value; the switchover element having an input operatively connected to the energy store so that a first voltage is applied to the input which essentially corresponds to the instantaneous operating voltage of the energy store and the switchover element having an output operatively connected to the energy source so that a second voltage is applied thereto which essentially corresponds to the instantaneous operating voltage of the energy source; and, the switchover element being configured to perform the function of a diode having a conductive direction from the energy store to the consumer.

The formulation "at the output of the switchover element essentially that potential is applied which corresponds to the instantaneous operating voltage of the energy source" is understood to mean that, at the output, the same potential is present (except for parasitic voltage drops) which corresponds to the instantaneous operating voltage. The same applies for the input.

The rated voltage of the energy store is so selected that it can adequately supply the electrical consumers of the safety system with electrical energy.

The basic idea of the invention is that the rated voltage of the second energy store is less than the rated voltage of the energy source and that the switchover element is so configured that it automatically switches over to a supply for the electrical consumers of the safety system with the aid of the electrical energy store when the instantaneous operating voltage of the electrical energy source is less than the instantaneous operating voltage of the electrical energy store. This automatic switchover takes place without a measurement of the voltage at the electrical energy store. In the invention, use is made of the fact that the electrical consumers in a safety system are so configured that they can be operated with different operating voltages. In this way, it is possible to provide two electrical energy supplies having different rated voltages.

The advantages achieved with the invention are especially that it is unnecessary to provide a voltage-monitoring unit which continuously measures the instantaneous operating voltage of the electrical energy source and which controls the switchover to the electrical energy store. Rather, the switchover operation from the electrical energy source to the electrical energy store takes place automatically. Correspondingly, the safety system has a simple configuration and high reliability with respect to malfunction.

A further advantage of the invention is that the switchover element is made up of purely passive components such as a diode. A still further advantage of the invention is that, during normal operation of the system (that is, when the electrical consumers are supplied from the electrical energy source), an unintended charging of the electrical energy store by the electrical energy source is precluded because a current flow via the switchover element is precluded. Furthermore, the electrical energy store is not loaded in normal operation so that the electrical energy store always has the maximum charged state when a switchover to the second energy store takes place.

According to another feature of the invention, the safety system includes a warning indicator which automatically outputs a warning signal when a current flows through the switchover element. The warning indicator can be configured so as to be optical and/or acoustical and the exciter for the warning indicator is preferably in series with the switchover element. The advantage of this further embodiment is that the warning indicator automatically emits a warning signal when the safety system is supplied from the electrical energy store. In this way, the safety system reliably provides a warning because a separate drive (which could possibly malfunction) of the warning indicator is not necessary.

According to still another feature of the invention, the electrical energy source can be connected via a charge/disconnect circuit to the electrical energy store. The charge/disconnect circuit establishes the connection when the electrical energy store is to be charged. The advantage of this further embodiment is that the electrical energy store can be recharged so that a self discharge of the energy store during the course of time or a discharge of the energy store because of a supply to the electrical consumers of the safety system can be compensated thereby. Charging of the electrical energy store is possible for so long as the instantaneous operating voltage of the electrical energy source is greater than the instantaneous operating voltage of the electrical energy store. Charging of the electrical energy store is therefore even possible when the electrical energy source is greatly loaded. For these reasons, a long service life and always fully available capacity of the energy store is ensured.

According to another feature of the invention, the charge/disconnect circuit includes one or several elements which perform the function of a voltage transformer and transform the instantaneous operating voltage to a charging voltage which is required for charging the electrical energy store. The operating voltage is made available by the electrical energy source. The advantage of this further embodiment is that, since during the charging operation, the instantaneous operating voltage at the electrical energy source is always greater than the rated voltage of the electrical energy store, the above-mentioned elements only have to step down the instantaneous operating voltage of the electrical energy source. Such voltage transformers can be realized very simply and therefore reliably and cost effectively. The charge voltage necessary for optimal charging from the electrical energy store is, for example, detected by sensors and transmitted to the charge/disconnect circuit so that the voltage transforming elements of the charge/disconnect circuit can generate a corresponding voltage value.

BRIEF DESCRIPTION OF THE DRAWINGS

The invention will now be described with reference to the drawings wherein:

FIG. 1 is a schematic of a safety system according to an embodiment of the invention; and, FIG. 2 is a schematic of a charge/disconnect circuit suitable for use in the embodiment shown in FIG. 1.

DESCRIPTION OF THE PREFERRED EMBODIMENTS OF THE INVENTION

FIG. 1 shows a safety system having two branches. In the first branch, the reference numerals are supplemented with the letter a and in the second branch, the reference numerals are supplemented with the letter b. The first branch concerns, for example, a loop of an electrical brake system and the second branch concerns, for example, a loop of an electrical steering system of a motor vehicle. The operations which occur in both branches correspond to each other so that the following description is directed only to the first branch.

The safety system includes an electrical energy source in the form of an on-board energy supply having a generator 2, a charging loop 4 and a battery 6. The on-board energy supply has a rated voltage of U1 volt and can supply the electrical consumer 18a with electrical energy via the diode 8a and the fuse 10a. The consumer 18a can be supplied with a variable operating voltage. Furthermore, the safety system includes an electrical energy store 14a in the form of a battery 14a which can make a rated voltage of U2 volt available. In normal operation of the system, U2<U1.

The battery 14a is connected to the electrical consumers 18a of the safety system via a switchover element 16a and an exciter (solenoid) in the form of a relay 30a. The battery 14a can supply the consumers 18a with voltage in the event of a critical voltage drop in the on-board energy supply. The switchover element 16a assumes the function of a diode having a conducting or forward direction from the battery 14a to the consumers 18a. In the simplest case, the switchover element can be configured as a diode so that, in FIG. 1, the switchover element 16a is shown as a diode. Furthermore, the battery 14a can be charged by the on-board energy supply as required via the charge/disconnect circuit 12a, the fuse 10a and the diode 8a.

In the following, a description is provided as to how the electrical consumers 18a of the safety system can be supplied with electrical energy.

In normal operation, the instantaneous operating voltage of the on-board energy supply is greater than U2. For this reason, in normal operation, the electrical consumers 18a are supplied via the diode 8a and the fuse 10a with electrical energy from the on-board energy supply. The battery 14a does not participate in the supply of the electrical consumers 18a because, during normal operation, the potential at point 22a is greater than U2; whereas, the potential at point 24a is a maximum of U2 which corresponds to the rated voltage of the second battery 14a. At point 22a, that potential is essentially present in normal operation which corresponds to the instantaneous operating voltage of the on-board energy supply. Parasitic voltage drops occur only at the diode 8a and at the fuse 10a and are negligible. Accordingly, in normal operation, a current flow from the battery 14a to the electrical consumers 18a is not possible via the switchover element 16a and the exciter 30a. Accordingly, the battery 14a is not subject to load in normal operation of the safety system and therefore always exhibits at least its rated voltage U2 in normal operation. Furthermore, an unintended charging of the battery 14a by the battery 6 does not take place in normal operation via the switchover element 16a.

The limit value in the on-board energy supply is given by U2 and corresponds to the rated voltage of the battery 14a. If a critical voltage drop occurs below this limit value, then a lower potential is present at the output 22a of the switchover element 16a than at the input 24a of the switchover element 16a. With a critical voltage drop below the limit value U2 in the on-board energy supply, a current flow automatically occurs from the battery 14a via the switchover element 16a and the relay 30a to the electrical consumers 18a so that the latter are then supplied with voltage by the battery 14a. The battery 14a is available exclusively for the voltage supply of the electrical consumers 18a because a current flow from the battery 14a into the on-board energy supply is precluded by the diode 8a. The relay 30a closes the switch 32a so that the warning indicator 20a is automatically actuated when the energy supply of the system is provided by the battery 14a.

If the energy supply again provides an operating voltage which lies above U2, then a potential is automatically present also at point 22a which is above U2 (the voltage drop at the diode 8a and the fuse 10a can be neglected) so that the safety system is again automatically switched over to normal operation.

A description will now be provided as to how the battery 14a is charged via the on-board energy supply.

The battery 14a can, for example, be continuously charged by the on-board energy supply during driving operation of the motor vehicle. Via sensors 38, a determination is made as to the charging voltage which is instantaneously needed in order to be able to optimally charge the battery 14a. The sensors 38 can, for example, measure the battery temperature of the battery 14a. This information is transmitted to the charge/disconnect circuit 12a. The charge/disconnect circuit 12a can, for example, include a solenoid 40 driven by an amplifier 42 connected to sensor 38. If a recharge of the battery 14a is required, then the switch 28a in the charge/disconnect circuit 12a is closed via solenoid 40 so that the battery 14a is connected via the diode 8a and the fuse 10a and the charge/disconnect circuit 12a to the on-board energy supply and is charged by the latter. The charge/disconnect circuit includes elements which transform the instantaneous operating voltage (provided by the on-board energy supply) to the instantaneously needed charge voltage for optimal charging of battery 14a. When the battery 14a is again fully charged, then a corresponding information is, in turn, transmitted to the charge/disconnect circuit 12a. Thereupon, the switch 28a is opened so that the charging operation of the battery 14a is completed.

It can be determined that charging of the battery 14a by the on-board energy supply is always possible when the instantaneous operating voltage in the on-board energy supply is greater than the instantaneous operating voltage at the battery 14a. A recharging of the battery 14a is even possible when the on-board voltage supply is greatly loaded by electrical consumers.

FIG. 2 is a schematic representation of a charge/disconnect circuit 12a and includes a switch 28a, a dc/dc voltage transformer and a diode 36a. The battery 14a is connected to the on-board energy supply by means of the switch 28a. In the dc/dc voltage transformer, the voltage made available by the on-board energy supply is transformed to the charging voltage for the battery 14a. This charging voltage is needed for optimal charging. The diode 36a prevents a current flow from the battery 14a to the consumers 18a via the charge/disconnect circuit. In this way, a discharge of the battery 14a via the charge/disconnect circuit 12a is prevented even when the switch 28a should erroneously close during normal operation.

It is understood that the foregoing description is that of the preferred embodiments of the invention and that various changes and modifications may be made thereto without departing from the spirit and scope of the invention as defined in the appended claims.

What is claimed is:

1. A safety system for an electrical consumer including an electrical brake arrangement or an electrical steering arrangement for a motor vehicle, the safety system comprising:

an electrical energy source having a first rated voltage and supplying said electrical consumer with electrical energy during normal operation;

an electrical energy store having a second rated voltage less than said first rated voltage;

a switchover element for connecting said consumer to said energy store when the instantaneous operating voltage of said energy source drops below a limit value;

said switchover element having an input operatively connected to said energy store so that a first voltage is applied to said input which essentially corresponds to the instantaneous operating voltage of said energy store and said switchover element having an output operatively connected to said energy source so that a second voltage is applied thereto which essentially corresponds to the instantaneous operating voltage of said energy source; and, said switchover element being configured to perform the function of a diode having a conductive direction from said energy store to said consumer.

2. The safety system of claim 1, wherein a current flows through said switchover element when said switchover element becomes conductive; and, said system further comprising: warning indicator means for responding to said current by emitting a warning signal.

3. The safety system of claim 1, further comprising:

a charge/disconnect circuit connected between said energy source and said energy store and being switchable to connect said energy source to said energy store;

means for monitoring said energy store and for emitting a signal when said energy store is to be charged; and, said charge/disconnect circuit including means for switching said charge/disconnect circuit to connect said energy source to said energy store in response to said signal.

4. The safety system of claim 3, said charge/disconnect circuit further including voltage transformer means for transforming said operating voltage of said energy source to a charging voltage adequate for charging said energy store.

* * * * *